United States Patent [19]

Risitano et al.

[11] Patent Number: 4,757,787
[45] Date of Patent: Jul. 19, 1988

[54] METHOD OF AND AN ARRANGEMENT FOR BURNING A LIQUID OR GASEOUS FUEL IN A COMBUSTION CHAMBER OF AN INTERNAL COMBUSTION ENGINE

[76] Inventors: Antonino Risitano, V.le Andrea Doria 6, I-95125 Catania; Lanzafame Rosario, Via Vaccarini, 11, I-95030 S. Agata Li Battiati, both of Italy

[21] Appl. No.: 893,323
[22] PCT Filed: Jun. 13, 1985
[86] PCT No.: PCT/EP85/00282
 § 371 Date: Jul. 31, 1986
 § 102(e) Date: Jul. 31, 1986
[87] PCT Pub. No.: WO86/03556
 PCT Pub. Date: Jun. 19, 1986

[30] Foreign Application Priority Data

Dec. 5, 1984 [IT] Italy ................. 6628 A/84
Dec. 14, 1984 [IT] Italy ................. 6632 A/84
Feb. 8, 1985 [IT] Italy ................. 6604 A/85

[51] Int. Cl.⁴ .......................................... F02M 25/02
[52] U.S. Cl. .............................. 123/25 A; 123/25 B; 123/25 C
[58] Field of Search ............. 123/25 A, 25 B, 25 F, 123/25 L, 25 M, 25 R, 90.15, 25 C; 60/309

[56] References Cited

U.S. PATENT DOCUMENTS

| | | | |
|---|---|---|---|
| 2,017,643 | 10/1935 | Zucrow | 123/25 A |
| 2,352,267 | 6/1944 | Kelsey | 123/25 C |
| 2,509,648 | 5/1950 | Mock | 123/25 A |
| 3,635,201 | 1/1972 | High | 123/25 A |
| 3,682,142 | 8/1972 | Newkirk | 60/309 |
| 3,968,775 | 7/1976 | Harpman | 123/25 B |
| 3,980,055 | 9/1976 | Webb | 123/25 B |
| 4,191,134 | 3/1980 | Goodman | 123/25 J |
| 4,240,380 | 12/1980 | Slagle | 123/25 L |
| 4,279,223 | 7/1981 | Csonka et al. | 123/25 N |
| 4,305,352 | 12/1981 | Oshima et al. | 123/90.15 |
| 4,406,255 | 9/1983 | Goodman | 123/25 J |
| 4,408,573 | 10/1983 | Schlueter et al. | 123/25 P |
| 4,412,512 | 11/1983 | Cottell | 123/25 E |
| 4,448,153 | 5/1984 | Miller | 123/25 J |
| 4,479,907 | 10/1984 | Ogura | 261/18 A |
| 4,558,665 | 12/1985 | Sandberg et al. | 123/25 C |
| 4,589,377 | 5/1986 | Van Dal | 123/25 C |

FOREIGN PATENT DOCUMENTS

| | | |
|---|---|---|
| 0009779 | 9/1979 | European Pat. Off. |
| 2404829 | 8/1975 | Fed. Rep. of Germany |
| 2602287 | 7/1976 | Fed. Rep. of Germany |
| 2645237 | 4/1978 | Fed. Rep. of Germany |
| 3133939 | 8/1982 | Fed. Rep. of Germany |
| 3102088 | 3/1984 | Fed. Rep. of Germany |
| 3236233 | 4/1984 | Fed. Rep. of Germany |
| 3237305 | 4/1984 | Fed. Rep. of Germany |
| 3432787 | 3/1985 | Fed. Rep. of Germany |
| 0883995 | 7/1943 | France |
| 2006873 | 5/1979 | United Kingdom |
| 2093121 | 8/1982 | United Kingdom |
| 2107390 | 4/1983 | United Kingdom |

*Primary Examiner*—Willis R. Wolfe, Jr.
*Assistant Examiner*—M. Macy
*Attorney, Agent, or Firm*—Andrus, Sceales, Starke & Sawall

[57] ABSTRACT

A method of and an arrangement for burning a liquid or gaseous fuel in the presence of air or another oxidizer and by use of water in a combustion chamber (12) of an internal combustion engine, especially a reciprocating or rotary piston engine. During one or more selected phases, especially during the entire operation, prior to being introduced into the combustion chamber (12), the fuel is mixed intensively with air and a quantity of water which depends on the operation in order to reduce the fuel consumption and the emission of noxious components as well as to increase the efficiency when using low octane fuels, especially regular gasoline or acetylene as the fuel. The mixing takes place in a quasi-closed mixing chamber (22) in the intake passage (11). Upon compression and ignition of the fuel/air/water mixture in the combustion chamber (12) a progressing "primary combustion" of fuel/air is controlled just below the critical "detonation" temperature ($T_c$), which combustion gives rise to "secondary combustion" of the admixed water at every location of the combustion. The "secondary combustion" causes an overall smooth, progressing combustion within the combustion chamber (12).

13 Claims, 5 Drawing Sheets

FIG. 4 - Plot Of The Characteristic Curve

METHOD OF AND AN ARRANGEMENT FOR BURNING A LIQUID OR GASEOUS FUEL IN A COMBUSTION CHAMBER OF AN INTERNAL COMBUSTION ENGINE

BACKGROUND OF THE PRESENT INVENTION

The invention relates to a method of and an arrangement for burning a liquid or gaseous fuel in the presence of air or another oxidizer, and including introduction of water in a combustion chamber of an internal combustion engine, especially a reciprocating or rotary piston engine.

Conventional internal combustion engines, especially reciprocating piston engines with applied ignition, such as used in motor vehicles and stationary plants have a maximum thermal efficiency of approximately 30%. Thus the ratio of the energy value of the fuel supplied to the combustion chamber as compared to the energy which lastly is available, is no more than approximately 30%. Turbines, rotary piston engines, and the like are characterized by a similar low degree of efficiency.

It is known, in general, that the efficiency of internal combustion engines of the kind mentioned is increased by introducing water and other non-fuels into the combustion chamber, and in this context three different kinds of water addition are shown in the prior art and believed to be advantageous, namely:

(1) direct injection of water into the combustion chamber (for example DE-A-3 432 787 or U.S. Pat. No. 4,408,573);

(2) introduction of vapor or air of high humidity into the intake passage upstream of the combustion chamber (for example U.S. Pat. No. 4,479,907 or DE-A-2 602 287); and (3) formation of a fuel-water emulsion which is introduced into the combustion chamber (for example DE-A-3 236 233 or U.S. Pat. No. 4,412,512).

These known systems all work in response to one or more operating parameters, usually in dependence on the number of revolutions of the internal combustion engine (for example U.S. Pat. No. 4,191,134), the negative pressure prevailing in the intake passage (for example U.S. Pat. No. 4,240,380), a knocking or pinging sensor (for example U.S. Pat. No. 4,406,255), the exhaust gas pressure (for example U.S. Pat. No. 4,191,134), and/or the temperature prevailing in the intake passage (EP-A-0 009 779). All of these systems afford more or less improvement of the efficiency while at the same time reducing the emission of ecologically damaging exhaust gases, and particularly reducing CO and $NO_x$. The improvement in efficiency with the known structures should be about 10 to 15%, and this is quite remarkable. Furthermore, fuel consumption can be reduced by up to 50% (U.S. Pat. No. 4,479,907).

In order to further increase the efficiency and reduce the fuel consumption, it was also proposed by others to inject water directly into the combustion chamber in the range of the compressed fuel-air mixture and in front of the flame front during the combustion, i.e. after ignition of the fuel-air mixture but before autoignition of the final gas (cf. DE-A-3 133 939). This is intended to keep the temperature in the combustion chamber reliably below the "uncontrolled" or critical detonation or "knocking" temperature at higher compression ratios which are in the order of up to 18.7:1.

Starting from the very diverse state of the art mentioned, the inventors have invented a method and an arrangement of introducing the water which establishes an extremely smooth combustion even at the lowest speeds of the internal combustion engine, at higher efficiency and fuel savings which can reach approximately 60 to 65% and with a remarkable reduction of harmful substances, especially when using low octane fuel, such as regular gasoline or fuel of octane number "0", such as acetylene and the like.

The nucleus of the instant invention resides in the preparation and introduction of the fuel/water/air mixture into a combustion chamber while compressing and igniting the same such that an "initial or primary combustion" of the fuel/air mixture results at a temperature just below the uncontrolled or critical (head) temperature $T_c$ (knocking limit). The combustion with the present invention releases a correspondingly progressive "secondary combustion" of the admixed water. The "primary cycle" and the "secondary cycle" take place at each point of the combustion, in other words at each location of the flame front, in contrast to the solution according to DE-A-3 133 939. In contrast to the system known from this publication, and in accordance with the invention, a "primary combustion" occurs near the uncontrolled or critical temperature in the combustion chamber and is controlled by corresponding admixing of water. Up to now those skilled in the art were striving to produce combustion at the greatest possible temperature which is spaced from the critical temperature in the combustion chamber in order to positively prevent knocking or pinging of the internal combustion engine. It is for this reason that high octane fuels are used in high compression internal combustion engines for motor vehicles although they are required only in critical load ranges, and whereas the engines otherwise could operate on regular gasoline. However, sufficient reliability prevention of detonations at almost any operating condition is obtained by the use of high octane fuel (premium gasoline). In accordance with the present invention, the combustion occurs just below the detonation temperature limit at every operating condition, the peak temperature in the combustion chamber being kept just below the uncontrolled or critical temperature by the controlled admission of water at every operative state or working condition. Thus a temperature is controlled in the combustion chamber which is 1 to 5% below the critical temperature. This depends on the fuel used as well as the critical compression ratio or the critical pressure. It has been found that in applying the system according to the invention, the internal combustion engine can be run just below the detonation limit at every operative state or working condition, with "realistic" compression ratios $\rho$ (fuel/air) of up to 25:1.

In accordance with the method of the invention and in applying the arrangement according to the invention, surprisingly, highly explosive gases, such as acetylene may be burned without any difficulty in an internal combustion engine having a quasi-closed combustion chamber, as will be explained below with reference to an embodiment using a 1200 cm³ Austin engine for motor vehicles.

The combustion efficiency may be increased by up to 70% as compared to conventional internal combustion engines of the kind mentioned about when applying the method according to the invention or the arrangement according to the invention. The fuel consumption can be reduced by up to 65%. Also, the emission of CO and $NO_x$ is reduced to a minimum. The internal combustion engine is suitable above all for burning lead free gasoline. However, it should be stressed once again that the values mentioned can be obtained only if the "primary combustion" takes place just below the detonation temperature. The "secondary cycle" thus released at every locus of combustion continues the "primary cycle" such that on the whole a progressively "smooth" combustion is obtained. The "secondary cycle" so to speak causes dampening of the "initial or primary combustion" which takes place just below the knocking limit.

It is of great importance that the fuel, air or other oxidizing agent and water are mixed intensively before being introduced into the combustion chamber in order to achieve the "two-phase" combustion aimed at by the invention. With intensive mixing, the combustion takes place in the manner specified at each locus or place of combustion. To this end, a kind of mixing chamber is preferably formed in the intake passage before or upstream of the throttle flap which is usually provided. This mixing chamber, for instance, may be defined on the one hand by the air inlet opening and, on the other hand, by a constriction (venturi section) of the intake passage located upstream of the throttle flap. In this mixing chamber great turbulence of fuel, air, and water is created in order to achieve the desired thorough mixing of these three components.

The supply of water preferably takes place by injection into the mixing chamber mentioned, in response to the temperature prevailing in the combustion chamber, the injection of the water being effected at a temperature which is approximately from 1 to 5% below the critical temperature $T_c$. The "primary combustion" should take place just below the critical temperature in all operating conditions, possibly 1 to 2% below the critical temperature. The injection of water is metered accordingly.

Provision is made for an additional introduction of water into the mixing chamber mentioned under the control of negative pressure in the suction passage, the injection of water explained above being superposed over this additional introduction. The introduction of water caused by negative pressure in the suction passage is sufficient for bringing the "primary combustion" close to the critical temperature $T_c$ in uncritical phases of operation.

Surprisingly, it has also been found that highly explosive acetylene ($C_2H_2$) can be burned in accordance with the method of the invention without posing any risk and at extremely low consumption. In a test run with a 1200 cm$^3$ Austin engine, the following values of consumption were recorded:
Running time: 10 minutes
Rotational speed: 3000 r.p.m.
Consumption of $C_2H_2$: 0.35 kg
Consumption of $H_2O$: 2.8 kg.

The ratio of water to acetylene during this test thus was 8:1. There was also minimum emission of harmful substances during this test. In the combustion chamber, a temperature just below the critical temperature was maintained for the primary combustion of fuel (acetylene) and air. In the test the delivery of the water injection pump was constant during the injection phase. Of course, it is conceivable to render the delivery of the water injection pump variable in response to the temperature detected in the combustion chamber. The closer the temperature in the combustion chamber approaches the critical temperature, the greater the delivery of the water injection pump would have to be.

The external cooling of the combustion chamber is also significant. To this end, another temperature sensor (thermocouple) is provided at the water jacket surrounding the combustion chamber and coupled with the control unit for the cooling water pump.

The method according to the invention permits the combustion to be carried out at a "realistic" compression ratio of up to 25:1. The "realistic" compression ratio is defined as the volume of the fuel and oxidizer (air) alone. Such high "realistic" compression ratios are not possible with conventional internal combustion engines.

The water admixed to the fuel/air mixture in part may be recovered from the exhaust gases by known evaporation and condensation methods (cf. for example DE-C-3 102 088 or U.S. Pat. No. 4,279,223).

Of course, when applying the system according to the invention, the other engine parameters must be adapted accordingly. Specifically, it has been found that the ignition timing must be displaced closer to the upper dead center, with simultaneous earlier opening before the upper dead center position and a much later closing of the inlet valve after the lower dead center position. The "overlapping" thus is increased in order to obtain a good filling and flushing of the combustion chamber.

Apart from the temperature sensors described above, detonation or knocking sensors and/or pressure sensors may be provided for detecting the pressure in the combustion chamber to control the pressurized water injection and/or the external cooling agent pump. Although the use of detonation sensors is known, it has proved to be too inaccurate and not specific of the combustion. Above all, such detection sensors do not permit control of the initial primary combustion close to the detonation limit because the detonation limit is usually reached or surpassed before the detonation sensors respond.

For the structural design, reference should be made to the configuration of the water nozzle or nozzles embodied by a mouthpiece having a plurality of fine bores. Preferably the bores in the mouthpiece of the water nozzles are directed in the direction of flow and/or inclined with respect to the radial line of the mouthpiece so as to impress turbulences and an eddy current on the exiting water jets while, at the same time, vaporizing the same, whereby a contribution is made to the intimate mixing with fuel and air. Furthermore, turbulators in the form of guiding noses and the like may be associated with the fuel nozzle and/or the water nozzle(s).

If acetylene is used as fuel, at least one other fuel inlet is provided downstream of the throttle flap and opens into the intake passage, particularly the intake manifold. Moreover, a heat exchanger and/or a gas pressure regulator is preferably connected upstream of the fuel inlet. The heat exchanger mainly serves to preheat the gas as it expands in the intake passage or in the mixing chamber thereof so as to compensate for the temperature drop which occurs upon expansion and to prevent icing in the suction range.

When applying the system according to the invention, the exhaust gases have a rather low temperature, at any rate a substantially lower temperature than the exhaust gases of conventional internal combustion engines. For this reason, the magnitude of the exhaust gas temperature may be used as another control signal for controlling the injection of water, by corresponding provision of a thermocouple or temperature sensor to sense such temperature.

Finally, for especially critical operating phases injection of water may be coupled with the control of the throttle flap. In the phase, an additional manual control is provided over the temperature responsive control of the injection of the water.

BRIEF DESCRIPTION OF THE DRAWINGS

The drawings enclose an embodiment of the invention including an internal combustion engine for the combustion of acetylene and the combustion of regular gasoline. Referring to the accompanying drawings.

DESCRIPTION OF ILLUSTRATED EMBODIMENT

Figure 1:
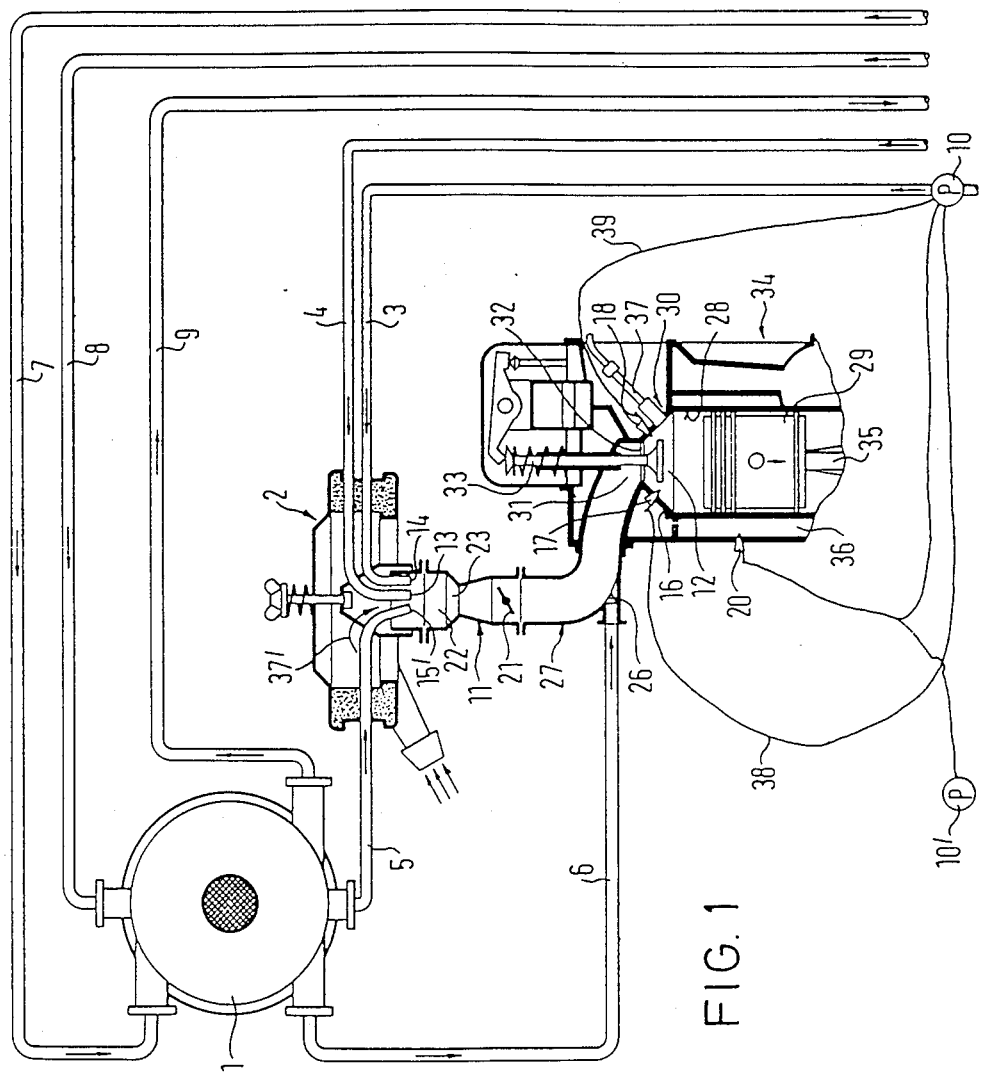
FIG. 1 is a diagrammatic partial section and a diagrammatic partial elevation of an internal combustion engine for burning acetylene.

FIG. 1 shows a reciprocating piston engine including the intake in a diagrammatic partial and sectional view. Acetylene serves as fuel. Reference numeral 30 designates a cylinder head including an inlet conduit 31, an inlet opening 32, and an inlet valve 33. An intake passage 11 comprising an intake manifold 26 is connected to the inlet conduit 31 and its free cross section is variable by a throttle flap 21. Reference numeral 28 designates the cylinder chamber within an engine block 34. In the cylinder chamber 28, a piston 29 is movable up and down in a conventional manner and is connected to a crankshaft, not shown, by means of a connecting rod 35. The cylinder chamber 28 is surrounded by a cooling water jacket 36. Feeding to the cooling water jacket 36 is effected by means of a cooling water pump 10'. The outlet valve which is likewise disposed in the cylinder head is not visible in FIG. 1 because it is located behind the inlet valve 33. A spark plug 37 is also disposed in the cylinder head between the inlet and outlet valves. Up to this point this is the conventional structure of a four-stroke cycle internal combustion engine.

The novelty of the embodiment shown in FIG. 1 of an internal combustion engine resides in the use of acetylene as fuel and also in the admixture of water to the fuel/air mixture in the intake passage 11 prior to the introduction into the combustion chamber 12. The combustion chamber 12 is defined in conventional manner by the cylinder head wall and the piston bottom. In front of or upstream of the throttle flap 21 a mixing chamber 22 is formed in the intake passage 11 and defined at the engine end by a constriction or venturi section 23. A fuel nozzle 15' and two water nozzles 13 and 14 open into this mixing chamber 22. An air filter 2 is placed on the upper end, as seen in FIG. 1, of the mixing chamber 22 or the end remote from the engine, and combustion air 37' may flow through the filter into the mixing chamber 22 past the nozzles 13, 14, and 15'. In the case of the embodiment shown, the water conduits 3, 4 and the fuel conduit 5 leading to the nozzles 13, 14 and 15', respectively, pass laterally through the air filter 2 which is a commercially available air filter for internal combustion engines.

Another fuel conduit 6 opens into the intake manifold 27 forming a fuel inlet 26 which extends tangentially. In this manner, an additional direct fuel supply can be made to the inlet conduit 31. This promotes the initial ignition or primary combustion of acetylene in the combustion chamber 12, a combustion which then releases a smooth secondary combustion of the admixed water at each place of the primary combustion or ignition, as explained above, by virtue of the intimate mixture, and as yet to be explained in greater detail, of fuel, air, and water in the area of the mixing chamber 22.

The supply of fuel, namely acetylene through the two fuel conduits 5 and 6 takes place by means of a pressure regulator 1 connected to a feed pipe 7. The feed pipe 7 communicates with an acetylene reservoir in which the acetylene to be burned is kept in liquid state. The pressure regulator 1 further comprises a heat exchanger communicating with the coolant circuit. Hot cooling water is delivered to the heat exchanger by way of a hot water supply line 8. In the heat exchanger, heat is dissipated to the acetylene to be burned. The cooling water thus cooled is returned to the cooling system through a discharge line 9. The heating of the acetylene which at first is a liquid, is required in order to compensate for the temperature drop occurring upon expansion and evaporation of the acetylene in the mixing chamber 22 and to prevent icing in this area. The same applies to the area of the fuel inlet 26.

The water conduits 3 and 4 are each connected to a water reservoir, not shown. The water conduit 3 includes a water pump 10 by means of which water under pressure may be injected into the mixing chamber 22. The supply of water through the water conduit 4 and the associated water nozzle 13 takes place exclusively in response to the negative pressure prevailing in the intake passage 11 or in the mixing chamber 22 and is controllable by the throttle flap 21. The supply of water through the nozzle 13 thus is dependent on the load. The additional supply of water through the conduit 3 and the water nozzle 14 is temperature controlled such that the pump 10 is activated when a predetermined temperature in the combustion chamber 12 just below the critical temperature $T_c$ (detonation temperature) is exceeded. Preferably the pump 10 is switched on at a temperature which is approximately from 1 to 5% below the critical (detonation) temperature. Two thermocouples 17 and 18 connected by electrical leads 38, 39 to the control unit of the pump 10 are associated with the combustion chamber 12 to determine the temperature in the same. Furthermore, a thermocouple 20 is associated with the cooling water jacket 36 and its signals also may be coupled with the control unit of the pump 10. The thermocouple 20, however, predominantly serves for control of the external cooling water pump 10'. The cooling water is circulated more or less intensively by the cooling water pump 10' in response to the signal from the thermocouple 20. This is intended to prevent overheating of the engine which is important in the instant case because a primary combustion just below the detonation limit is desired. The output or delivery of the pump 10 may be variable in response to the temperature in the combustion chamber, which temperature is detected by the thermocouples 17 and 18. Preferably the thermocouple 17 is arranged close to the inlet opening 32, while the second thermocouple 18 is disposed between the inlet opening 32 and the spark plug 37. The temperature of the primary combustion can be determined with great accuracy by comparing the temperatures detected by the thermocouples positioned as described and may be brought near the critical (detonation) temperature $T_c$ by corresponding control of the fuel and water injection.

Figure 5:
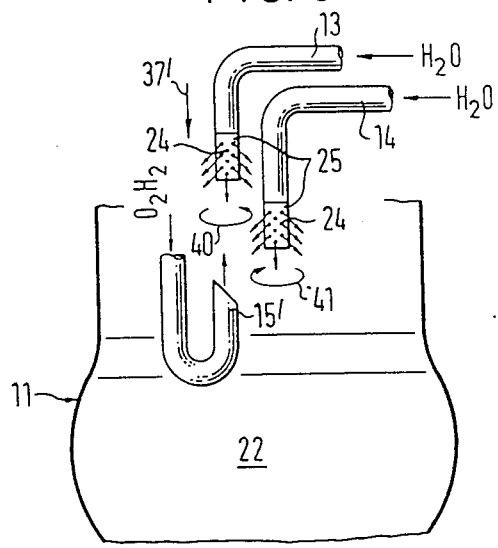
FIG. 5 is a diagrammatic side elevation of the fuel and water nozzles within the "mixing chamber" provided in the intake passage.

As explained above, an thorough mixing of fuel, water, and air before the introduction into the combustion chamber 12 is of great importance for the desired double cyclic combustion. To this end water and fuel are injected into the mixing space or chamber 22 in countercurrent whereby the injection of water and the injection of fuel are in opposite directions. Particularly good mixing is obtained if the fuel is directed against the air which is sucked in as well as in the water which is sucked in and/or injected. In this respect particular reference is made to FIG. 5. This figure shows the fuel nozzle 15' bent upwardly so that the fuel exits from the fuel nozzle 15' in upward direction against the air inlet 37'. Moreover, the fuel exit is somewhat below the downwardly directed water nozzles 13, 14. The constellation in the mixing space 22 of the intake passage 11 results in a thorough mixture of fuel, air, and water. To enhance the mixing, the water introduced is "atomized" as it exits. For this purpose the water nozzles 13, 14 each comprise a mouthpiece 25 having fine bores 24 through which the water exits. The bores 24 preferably are inclined downwardly in the direction of flow. In addition, the bores 24 may be inclined with respect to the radial line so that an additional rotational movement about the longitudinal axes of the water nozzles 13, 14 and mouthpiece 25, respectively, is impressed on the issuing water droplets. The rotational movements impressed on the water droplets may be in the same or in the opposite directions, as indicated for example by arrows 40, 41 in FIG. 5.

The fuel exiting from the fuel nozzle 15' may also be caused to spread out, forming a fuel cone. This latter measure also contributes to the fine distribution and thorough mixing of the components mentioned.

Turbulators may also be provided in the mixing space or chamber 22, having the form of noses or baffles which project into the mixing space 22. In this manner the components to be mixed are delayed in the mixing space 22 before passing through the venturi section 23 to the inlet conduit 31. An engine driven in this manner runs extremely smoothly, and with great truth of rotation and does so down to a rotational speed of approximately 250 r.p.m. A minimum emission of harmful substances takes place. The exhaust gas temperature is comparatively low. The ratio of water to fuel consumption is approximately 2:1 and more. This depends also on the other design data of the engine used.

Internal combustion engines fed with acetylene are especially well suited for stationary purposes (emergency power units and small power plants). Acetylene is readily available. For example, acetylene may be relased for example from calcium carbide. The use of acetylene as fuel as such has been known for a longer period of time, for instance in the so-called carbide lamp. In the latter case, the acetylene burns with atmospheric oxygen, forming carbon monoxide or carbon dioxide. Acetylene is now used for polymerization, yielding polyvinyl chloride (PVC). However, no apparatus or methods have been suggested in the prior art to utilize the high energy content of acetylene for operating an internal combustion engine and particularly for operating such an engine without knocking or pinging. There are no concrete statements in the prior art for the functionally safe running of an internal combustion engine, especially a conventional motor vehicle engine, with acetylene even though acetylene has the advantage that the raw materials for its production are available almost everywhere in sufficient quantities and without any exclusive limitation to a particularly defined geographic or political area.

Thus there is an abundance of the starting materials; namely, lime, carbon, water, and salt. Lime, for instance, may be recovered from limestone in limestone quarries or calcareous mountains as a very substantial component part of the crust of the earth, from chalk or from the seas or inland waters. Also carbon and coke are available in sufficient quantities for the purpose mentioned. Water and salt likewise are available in practically unlimited quantities. The preparation of acetylene no longer requires any special development because acetylene is presently produced in greater amounts for other purposes, such as for welding and cutting processes, as an important basic substance for plastic materials or synthetic caoutchouc, and also for the industrial production of fertilizers insecticides and pesticides. Another advantage of burning acetylene, is that the combustion of acetylene in the presence of air takes place without forming soot. The operation system according to the present invention is thus extraordinarily favorable to the environment. It is surprising that the explosion limit is approached in accordance with the invention in spite of the highly explosive characteristics of acetylene. In this respect, the invention follows a sequence which would seem to lead the ordinary worker to avoid the sequence of this invention. However tests have proven that the system has a functional safety and thus be without risk.

Figure 2:
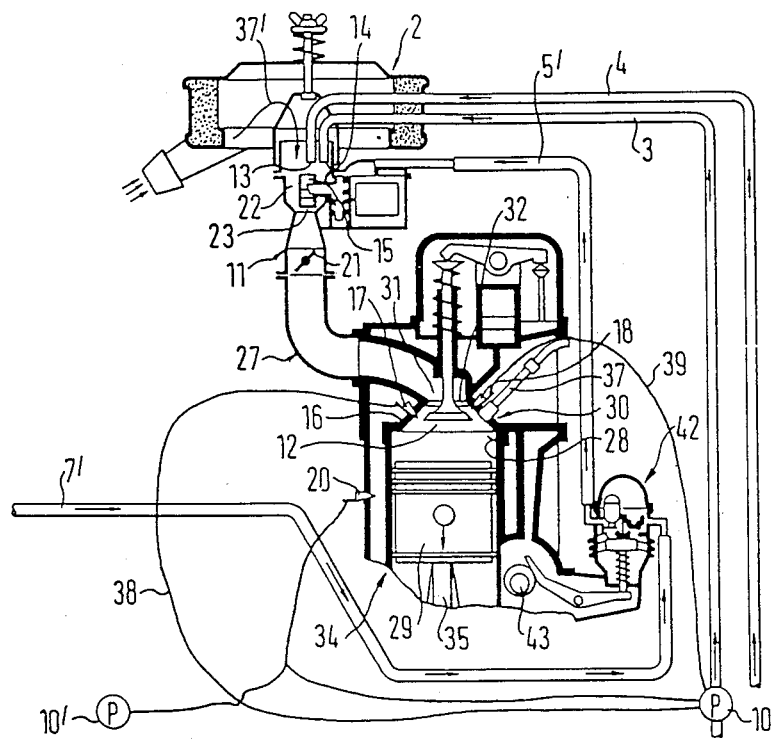
FIG. 2 shows the internal combustion engine of FIG. 1, for burning liquid low octane fuel, such as regular gasoline.

FIG. 2 is a diagrammatic presentation of a reciprocating piston engine operating with gasoline in combination with the system according to the invention. Apart from the fuel introduction in the area of the mixing chamber 22, this embodiment according to FIG. 2 is identical with that shown in FIG. 1. Accordingly similar parts are designated by similar reference numerals. A detailed explanation of the features already described with reference to FIG. 1 is therefore not repeated.

Liquid fuel, namely low octane gasoline, such as regular gasoline or the like is introduced in the area of the mixing chamber 22 through a fuel nozzle 15 directed upwardly, and against the air 37. The fuel nozzle 15 is connected to a gasoline pump 42 by a fuel conduit 5'. The pump is a commercially available cam-controlled diaphragm pump (camshaft 43). A connection between a tank, not shown and the gasoline pump 42 is established through a feed pipe 7'. In a manner similar to the embodiment shown in FIG. 1, the aperture of the fuel nozzle 15 is located below the water nozzles 13, 14 so as to obtain thorough mixing of injected fuel, water, and air.

Figure 3:
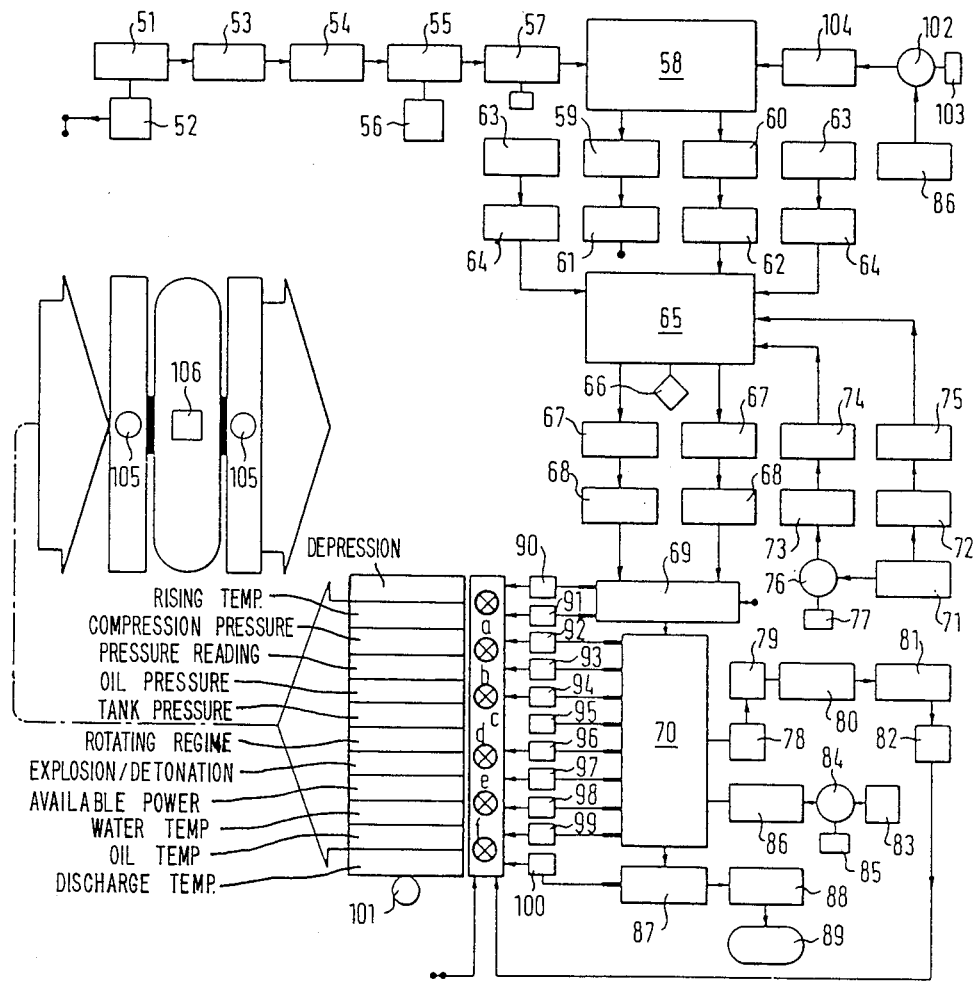
FIG. 3 is a block diagram of the control of the injection of water in response to operating parameters.

The overall system (testing stand) of the embodiment according to FIG. 1 will be presented in the form of a synopsis with reference to the block diagram shown in FIG. 3, the arrows in FIG. 3 indicating the direction of the flow of information or the linking between the individual elements of the system and the reference numerals designating the following elements of the system:

51 generator;
52 fuel tank pressure gauge;
53 admission cock;
54 safety valve;
55 pressure reducer for the fuel;
56 pressure gauge of pressure reducer;
57 electric valve for the acetylene supply;
58 control group;
59 electric valve for starting;
60 operating flow control;
61 minimum direct flow control/injection;
62 throttling device for operating flow;
63 air filter;
63 throttling device for air flow rate;
65 mixing chamber;
66 safety device;
67 gauged pipelines for mixer-carburetor;
68 multiple injection nozzles;
69 intake manifold;
70 engine;
71 coolant tank;
72 pipeline for the vacuum-controlled water supply;
73 pipeline for the temperature-controlled water supply;
74 injector;
75 injector;
76 injection pump;
77 pump thermostat;
78 change speed gear and double clutch to the brake;
79 means of the controlled supply system for the hydrodynamometric brake;
80 hydrodynamometric brake;
81 main valve for level control of the turbine and system for load signaling;
82 measurement section of power output;
83 water tank for external engine cooling;
84 pump for external water cooling;
85 pump thermostat;
86 radiator;
87 exhaust manifold and exhaust gas (exhaust) pipe;
88 pipeline for reception and valve for discharge of exhaust gases to a gas chromatograph;
89 gas chromatograph;
90 vacuometer;
91 thermometer for intake manifold;
92 pressure control for compression stroke;
93 oil pressure control;
94 oil pressure gauge;
95 vacuum control for the ignition advance timing;
96 electronic speedometer;
97 detonation (knocking) sensor;
98 water thermometer;
99 oil thermometer;
100 thermometer of exhaust manifold;
101 switchboard for the controls, measurements, and signals;
102 circulation pump for the (heat) exchanger of the control group;
103 pump thermostat;
104 pipeline for hot water supply to the fuel heat exchanger;
105 interfaces;
106 unit for automatic combustion control
  (a) signaling of the pressure regulator for the compression stroke;
  (b) signaling for the oil pressure regulator;
  (c) signaling for the excitation of the electric valve for the acetylene supply;
  (d) signaling of the thermostat for the temperature-controlled water injection;
  (e) signaling for switch-on of the cooling water pump (external engine cooling);
  (f) signaling for the functioning of the circulation pump of the heat exchanger of the pressure control group.

It should be stressed once more that the injection of water into the mixing chamber 22 should be made in response to the temperature rise or the temperature drop, respectively, in the combustion chamber 12. In addition, manual water injection may be provided for critical phases of operation (for example in a motor vehicle during suddenly rising load during the lowest engine speed).

A conventional gasoline engine for motor vehicles will be compared below with an engine modified in accordance with FIG. 1 for the combustion of acetylene:

Specification of the engine used:
make: Innocenti
model: 3 AU/H
cycle: 4-stroke
cylinders: 4
bore: 62.9 mm
stroke: 76.2 mm
piston displacement: 948 cm$^3$
compression ratio: 8.3:1
maximum output (4800 r.p.m.): 58.5 kW
maximum torque (2200 r.p.m.): 70 Nm
ignition: 12 V battery ignition coil ignition distributor
ignition advance: automatically by centrifugal force
valve control: overhead valves with rocker arm control
inlet valve opens 5° before the upper dead center (OT) and closes 10° after the lower dead center (UT)
outlet valve opens 40° before UT and closes 10° after OT
fuel: gasoline 98/100 N.O.R.M. delivery by mechanical diaphragm pump
water cooling: thermostatic system
specific minimum consumption at full load: 320 g of gasoline per 1 kWh.

The engine specified was modified as follows for the combustion of acetylene:
reduction of the ignition advance (change of the centrifugal force angle of advance) into a non-linear vacuum angle of advance, the static preignition being kept constant;
adjustment of the inlet and outlet valves as follows:
  (a) inlet valve opens 15° before OT and closes 55° after UT;
  (b) outlet valve opens 40° before UT and closes 10° after OT;
vacuum- and temperature-controlled water injection in the intake passage (cf. above explanations!);
additional temperature-controlled external water cooling.

The investigations showed that the ratio between the consumption of water and the consumption of acetylene lies between approximately 2:1 and up to 7:1. The efficiency of the engine could be increased by up to 70%. There was minimum emission of harmful substances. The exhaust gases contained only minor amounts of CO. The same applies to nitric oxides $NO_x$.

Figure 4A:
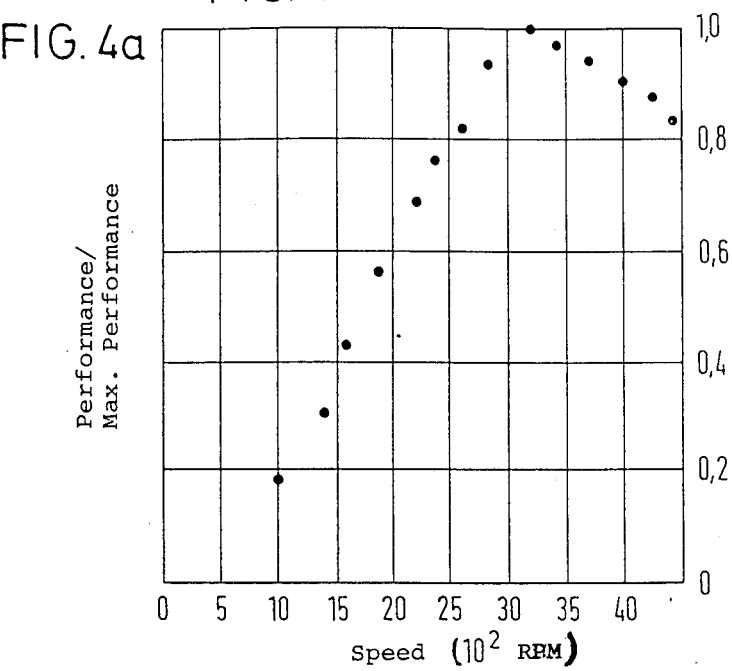
FIGS. 4a-c are performance, torque, and consumption diagrams of a reciprocating piston engine operated in accordance with the invention.
Figure 4B:
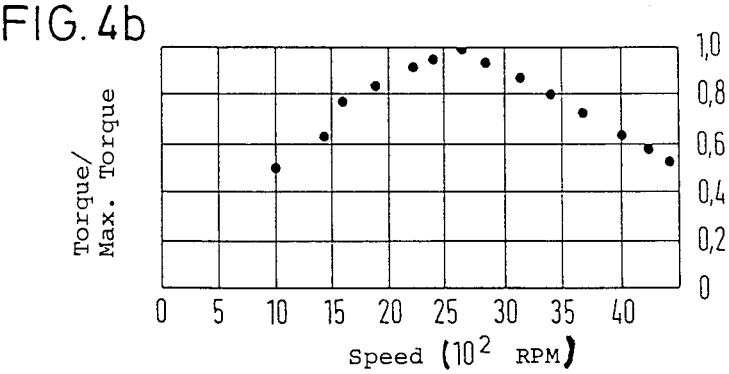
Figure 4C:
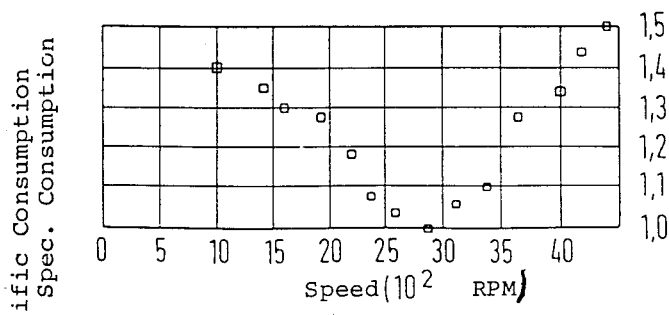

Furthermore, the investigation showed that the operating characteristics (performance, torque, and consumption) corresponded to that of conventional internal combustion engines. In this regard reference is made to FIGS. 4a to 4c. The engine ran extremely smoothly or with utmost truth of rotation even at rotational speeds of only some 250 r.p.m.

Investigations with gasoline supplied to the engine showed that on the average the ratio of water to gasoline (regular gasoline) to air is as follows: 0.5:1:20.

The water introduced into the intake passage may be of room temperature. Preferably, however, it is preheated to approximately 65° C. This may be done by heat exchange with the cooling water system or by admixing water recovered from the exhaust gas.

In conclusion comparison of the invention and the art clearly discloses the following.

It is known to increase the efficiency of the combustion in the interior of the cylinder and to eliminate or partially reduce abnormal combustion processes, like spark advance, spontaneous combustion, detonation of the charge by injecting water into the interior of the combustion chamber so as to cool the reactive surroundings and, at the same time, eliminate or reduce the causes determining the above mentioned abnormal effects. At any rate, the practical result of the injection of water into the interior of the combustion chamber of internal combustion engines (at the present state of engine practice) is a slight improvement of the global combustion of the system and thus of the efficiency of the thermal engine (small improvement) combined with a reduction (likewise modest) of noxious components in the combustion products emitted.

These positive results are of little effect in practice when compared with the complex technical expenditure which is required to solve the delicate problems of control involved, and particularly relating to the control of the flow rates of the water to be injected and their continuous variation in response to the rotational speed and the metering ratio of fuel/oxygen carrier.

In other words, if one considers the effective (mass) quantities of water as compared to the fuel/oxygen carrier charge, the principle of injecting water into the combustion chamber of endothermic engines does not suggest that an actual injection process occurs wherein an auxiliary fluid is injected in quantities comparable with the first two mentioned (fuel/air). Rather, the prior art only discloses the injection of liquid particles which represent a small percentage of the overall mixture. If the various prior art injection systems do afford some advantages, these advantages are not worth the expenditure needed because they involve substantial modifications of the structure and in the supply of fuel to the system in order to achieve an acceptable control. In most cases, the prior art is found to be complicated and unreliable. As a consequence, such prior art principles of injection are still nothing but a special option suitable, at best, for engines already characterized by excellent performance and to be reduced to practice only by taking recourse to complicated and very expensive techniques. This is true especially if the realistic advantages actually to be achieved are taken into consideration.

As it is obvious that all water injection systems proposed so far substantially are based on the principle of introducing minute quantities of water (as compared to the total quantities of the mixture) directly into the combustion chamber in front of or behind the suction valve, the following statements are submitted regarding the present invention:

1. In sharp contrast to the prior art principle used universally patent protection is requested for the concept of carrying out a "vapor cycle produced in the interior of the combustion chamber of an endothermic engine".

2. A thermodynamic cycle in which the quantity of the vapor available (produced), which is called secondary fluid, has a mass which is comparable with that of the combustion air required for combustion of the active charge, called primary fluid.

3. A thermodynamic cycle is created in which indeed there are two active fluids at one and the same point in time of reaction: vapor produced by evaporation of the additional water) and combustion gases (produced by combustion of the primary fluid), and these two active fluids are available in percentages of the same order of magnitude.

The injection systems and techniques presently disclosed provide for injecting masses of water in very small quantities (a few percent of the mass of the air), yielding effects which are slightly above the conventional ones. These values of efficiency are not directly linked to the percentage quantity of the water injected.

In sharp contrast to the present, the thermodynamic cycle proposed by the inventors cannot be carried out unless special thermophysical conditions of the temperature, pressure, and volume of the charge injected and compressed (prepared above the suction valve or the throttle flap of the carburetor) are created in the combustion chamber of the endothermic engine so that a controlled explosion is achieved and produced in which the mass doses of the water injected keep the reaction at a balance with the proper enthalpy content rising immensely by utilizing the energy (released in the intended explosion operation) which is otherwise not useful (or being lost irretrievably if there is no exchange with the water injected into the charge and homogenized with the charge as in the present invention).

It follows from the above that the doses of water are the greater, the stronger, more violent, and blazing the explosion of the air/fuel mixture is. In the final analysis, not only products of the working cycle of the engine (primary fluid of the engine) are available but also enormous amounts of superheated steam or vapor of a very high energy content.

The role played by the injected water thus is not the same as in the prior art, namely to avoid temperature peaks because of abnormal combustions. Rather, and in contrast to all known and accepted rules of the construction of engines so far, it is the function of the water emulsified in the charge to take part in the explosive reaction (ignited in suitable manner) by taking up very large quantities of energy (otherwise not useful), increasing its enthalpy content and successively dissipating the same during the expansion.

To the inventors, therefore, combustions would become abnormal with which the water would act as an inhibitor of the combustion in the absence of the pressure, temperature and critical volume conditions.

The novel principle differs from the former solutions also because nobody ever thought of (intentionally) or disclosed using an explosive product in order to inject it into the combustion chamber of an endothermic engine.

The inventors have reduced to practice a system which makes use exactly of the idea proposed, investigating the behavior of a compound known for its great instability and easily decomposed in an explosive reaction, namely $C_2H_2$.

By the release alone of such reactions—inconceivable so far—it becomes possible to withdraw from the "violent combustion" those amounts of energy which, upon transmission into the secondary fluid water introduced, render quantities of vapor comparable percentagewise with the fuel/air mixture which generated them.

The practicing of this concept by means of a system whose parameters go far beyond the values of the present day normal engine practice has proved to be very positive, also in respect of measurements of the overall efficiency of the system made on the testing stand.

The characteristic curves reveal results which are fully in agreement with conventional characteristics. The values of the efficiency on the average are significantly higher than with conventional operation using gasoline 98-100 N.O., i.e. the resulting efficiencies are from 37 to 40%.

This means that the principle of the invention disclosed and investigated experimentally in broad scope by the inventors using acetylene, is applicable also to any other test fuels, provided that characteristic conditions of an explosive instability are created in the combustion chamber, comparable to those resulting from the compression of acetylene.

The closer one approaches the explosive operation, the more the vapor quantities are dominant over the fuel masses. It is evident that reactions of this kind would be uncontrollable in the absence of water and would lead to genuine multiple chain explosions, with the reaction temperatures rising to above the critical temperatures and, therefore, becoming unacceptable high for the materials making up the engine.

Figure 6:
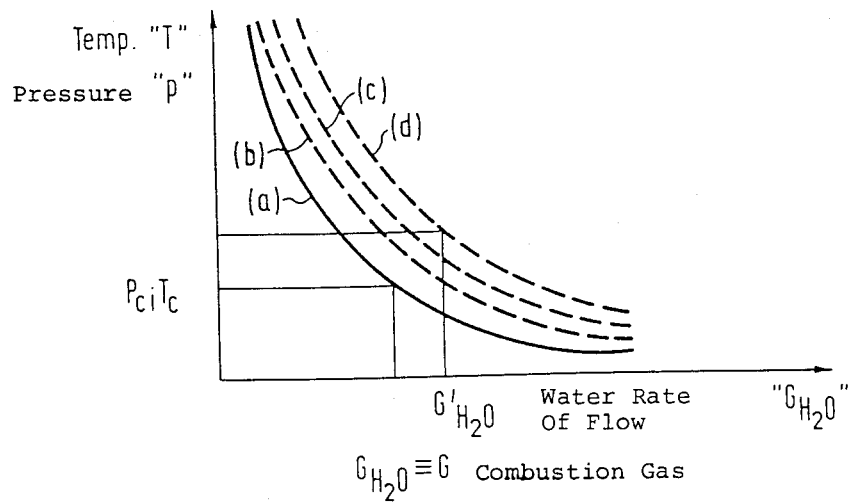
FIG. 6 shows the qualitative characteristic of the thermal and pressure parameters of the explosive reactions as a function of the water admixture and of the fuel.

FIG. 6 shows the qualitative course of the thermal and pressure parameters of the explosive reactions as a function of the rate of flow ($G_{H2O}$) of the water emulsified in the air/fuel charge. A characteristic can be drawn for any kind of test fuel (fuel a, b, c, d, etc.).

This means that the critical values $T_c$ and $P_c$ are reached for the fuel (a) having certain structural properties (explosion behavior) at a rate of flow of $C_{H2O}$ of the water injected. This rate of flow could prove to be insufficient for the fuel (b) if the design values $T_c$ and $P_c$ are to be constant. If, on the other hand, new design values $P_c$ and $T_c$ are to be achieved when using the fuel designated (d), the required new rate of flow would be $G'_{H2O}$.

This further provides the possibility of achieving predetermined design values $T_c$ and $P_c$ (which are functions of the explosive behavior of the test fuel) by influencing, from case to case, the basic parameters of the engine which regulate and control the combustion reaction.

The interventions relating to the basic parameters of the engine described above must be made more drastic the lower the "explosive characteristics" of the respective test fuel are. This is necessary in order to provide "stimulating conditions" at the limit of explosiveness, even if the respective fuel has only a low explosive capacity.

If, for example, the capability of a fuel to react explosively is set as a parameter of classification (for the time being leaving out of consideration NITROGLYCERIN), acetylene indeed may be assumed to have the first rank, whereas conventional gasoline (98-100 N.O.) would have the last position. For this reason the inventors are of the opinion that different fuels exist "in the middle" which can be used as test fuels in practicing the endothermic vapor cycle in the engines.

This demonstrates once more the novelty of the principle disclosed and reduced to practice, as compared to the present day state of the art carried out by others. The latter in fact tend to carry out the different methods with the aid of high-grade or commercially available fuels.

The significance of the engine parameters having direct or indirect influence on the effectiveness and circumstances of the combustion will not be dealt with in detail here because numerous descriptions thereof exist and have been specified in detail in the scientific publications of the pertinent technical field. The parameters are linked to the structural, technological, and functional properties of the engine unit. The principle presented here may be extended not only to any kind of fuel but also to any kind of thermal power engines.

It follows from the above, for instance, that with a turbine installation it is possible to produce thermodynamic cycles of extremely high efficiency by combustions in the interior of the burner so that considerable amounts of superheated vapor are produced which are comparable with the air serving as oxygen carrier. This steam subsequently expands in the turbine. If one proceeds in the manner described, one obtains values of the global efficiency which are decisively higher than with conventional gas turbine units.

Beyond the combustion of the gases, therefore, vapor of very high enthalpy content can be produced, at the same time, drastically reducing the losses occurring in the various conventional apparatus which are typical and necessary for the energy producing plants (heaters, burners, superheaters, heat exchangers, condensers, etc.).

All the features disclosed in the documents are claimed as essential of the invention to the extent that they are novel with respect to the state of the art, either individually or in combination.

We claim:

1. A method of burning fuel in the presence of an oxidizer such as air and water in a combustion chamber of an internal combustion engine, comprising mixing fuel prior to being introduced into the combustion chamber intensively with air and a quantity of water to establish a fuel mixture, introducing said mixture into the combustion chamber, igniting said mixture, compressing said mixture, while being ignited, so as to cause a progressive primary combustion of the fuel and air in said fuel mixture just below a critical denotation temperature ($T_c$) corresponding to the knocking limit, injecting said water under pressure only after the fuel mixture temperature approaches the critical detonation temperature of said primary combustion, and interrupting said injection of water when the fuel mixture temperature drops below a predetermined lower temperature limit which lies approximately in the range of 1 to 5% below the critical temperature ($T_c$), said primary combustion releasing a corresponding secondary combustion of the admixed water in said fuel mixture.

2. The method of claim 1 wherein said intensive mixing step includes supplying said water in a finely vaporized state.

3. The method of claim 2 wherein said water is introduced in a suction range of the interval combustion engine and in countercurrent to the fuel.

4. The method of claim 3 wherein said water is injected under pressure and forms a substantially homogeneous fuel/air/water mixture.

5. The method of claim 1 wherein said fuel is a low octane fuel.

6. The method of claim 1 wherein said fuel is acetylene ($C_2H_2$).

7. The method of claim 1 wherein said engine includes a suction range and has means to introduce said water into a passage having a load responsive negative pressure acting in the suction range of the internal combustion engine and optionally to inject additional water under pressure in dependence on the temperature of the combustion chamber.

8. The method of claim 1 wherein the fuel is a gaseous fuel and is preheated prior to being introduced into the fuel/air/water mixing area.

9. The method of claim 6 wherein the fuel is a gaseous fuel and is preheated prior to being introduced into the fuel/air/water mixing area.

10. The method of claim 1 wherein said intensive mixing includes vigorous whirling of said fuel and air and with the introduction of said water into said whirling in a quasi-closed mixing area.

11. The method of claim 1 wherein combustion is carried out at a compression ratio of up to 25:1.

12. The method of claim 1 wherein the water admixed to the whirling mixture includes water condensed from the exhaust gases.

13. The method of claim 1 including creating an applied ignition and adjusting the ignition timing displaced closer to the upper dead center and simultaneous early opening and much later closing of the inlet valve before the upper dead center and after the lower dead center, respectively.

* * * * *